United States Patent
Schimunek et al.

(10) Patent No.: US 10,452,716 B2
(45) Date of Patent: Oct. 22, 2019

(54) OPTIMIZING COMPLEX PATH ENDPOINT RESOLUTION

(75) Inventors: Gottfried Schimunek, Rochester, MN (US); Jaroslaw Miszczyk, Rochester, MN (US); Brent J. Baude, Rochester, MN (US); Robert A. Bittner, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 888 days.

(21) Appl. No.: 12/135,150

(22) Filed: Jun. 7, 2008

(65) Prior Publication Data

US 2009/0307241 A1    Dec. 10, 2009

(51) Int. Cl.
| | |
|---|---|
| *G06F 16/00* | (2019.01) |
| *G06F 16/901* | (2019.01) |
| *G06F 16/13* | (2019.01) |

(52) U.S. Cl.
CPC .......... *G06F 16/9014* (2019.01); *G06F 16/13* (2019.01)

(58) Field of Classification Search
CPC .............................. G06F 16/13; G06F 16/9014
USPC .................................................. 707/600–899
See application file for complete search history.

(56) References Cited

U.S. PATENT DOCUMENTS

| | | | | |
|---|---|---|---|---|
| 5,347,652 A | * | 9/1994 | Epstein | G06F 16/9014 |
| 6,470,344 B1 | * | 10/2002 | Kothuri | G06F 16/2264 |
| | | | | 707/696 |
| 6,594,665 B1 | * | 7/2003 | Sowa | G06F 16/9014 |
| 6,728,732 B1 | * | 4/2004 | Eatherton et al. | |
| 7,383,274 B2 | * | 6/2008 | Pearce et al. | |
| 8,131,691 B1 | * | 3/2012 | Nagaralu | G06F 16/13 |
| | | | | 707/696 |
| 2002/0083033 A1 | * | 6/2002 | Abdo | G06F 16/30 |
| 2004/0107402 A1 | | 6/2004 | Seyrat et al. | |
| 2005/0055334 A1 | * | 3/2005 | Krishnamurthy | 707/2 |
| 2005/0055355 A1 | * | 3/2005 | Murthy et al. | 707/100 |
| 2007/0192564 A1 | * | 8/2007 | Loeb | G06F 16/2255 |
| | | | | 711/216 |
| 2007/0198545 A1 | * | 8/2007 | Ge et al. | 707/100 |
| 2008/0005208 A1 | | 1/2008 | Vaswani et al. | |
| 2009/0271418 A1 | * | 10/2009 | Vaghani | G06F 11/1435 |

OTHER PUBLICATIONS

P. McKenney et al., "Scaling dcache with RCU," Linux Journal, Jan. 1, 2004, 12 pages.

* cited by examiner

*Primary Examiner* — Michelle N Owyang
(74) *Attorney, Agent, or Firm* — Walter W. Duft (57) ABSTRACT

A technique for optimizing complex endpoint resolution in a hierarchical data structure. The technique includes maintaining an encoding between a path through the hierarchical data structure and the endpoint node of the path. When an input pathname corresponding to the path is received, the pathname is used to resolve the endpoint node from the encoding without traversing the path.

18 Claims, 8 Drawing Sheets

OPTIMIZING COMPLEX PATH ENDPOINT RESOLUTION

BACKGROUND OF THE INVENTION

1. Field of the Invention

The present invention relates to computer systems and methods that use hierarchical data structures comprising objects that are searched, such as file systems.

2. Description of the Prior Art

By way of background, many hierarchical data structures, such as file systems on any computer, are becoming increasingly larger and more complex. In the case of files systems, this is due to the increasing number of files and directory levels that are represented by objects arranged in searchable tree hierarchies. Data structure complexity increases when there are many directory levels that create deep hierarchies and lengthy path names. Traversing and accessing individual objects in large file system and other hierarchical data structures can be very resource-expensive, requiring an inordinate amount of time, and creating scalability issues.

As hierarchical data structures grow in size, processing time tends to increase in a nonlinear fashion due to increasing contention for the objects being processed. This can add significantly to overall performance response times. It also becomes an increasingly unmanageable access method due to the sheer size of the data structures and the number of elements in each node. In addition, heavily used data structures, such as file system tree hierarchies, are a source of contention when multiple users and applications traverse and modify the directory structures concurrently. This can cause significant processing delays, even when the directory structure elements are already in memory.

It is to improvements in the area of hierarchical data structure access that the present invention is directed. In particular, a new technique is proposed that greatly improves the ability to perform endpoint resolution, especially as data structure complexity increases.

SUMMARY OF THE INVENTION

An advance in the art is obtained by a method, system and computer program product for optimizing complex endpoint resolution in a hierarchical data structure. The technique includes maintaining an encoding between a path through the hierarchical data structure and an endpoint node of the path. When an input pathname corresponding to the path is received, the pathname is used to resolve the endpoint node from the encoding without traversing the path.

BRIEF DESCRIPTION OF THE DRAWINGS

The foregoing and other features and advantages of the invention will be apparent from the following more particular description of example embodiments of the invention, as illustrated in the accompanying Drawings, in which.

DETAILED DESCRIPTION OF EXAMPLE EMBODIMENTS

Introduction

Figure 1:
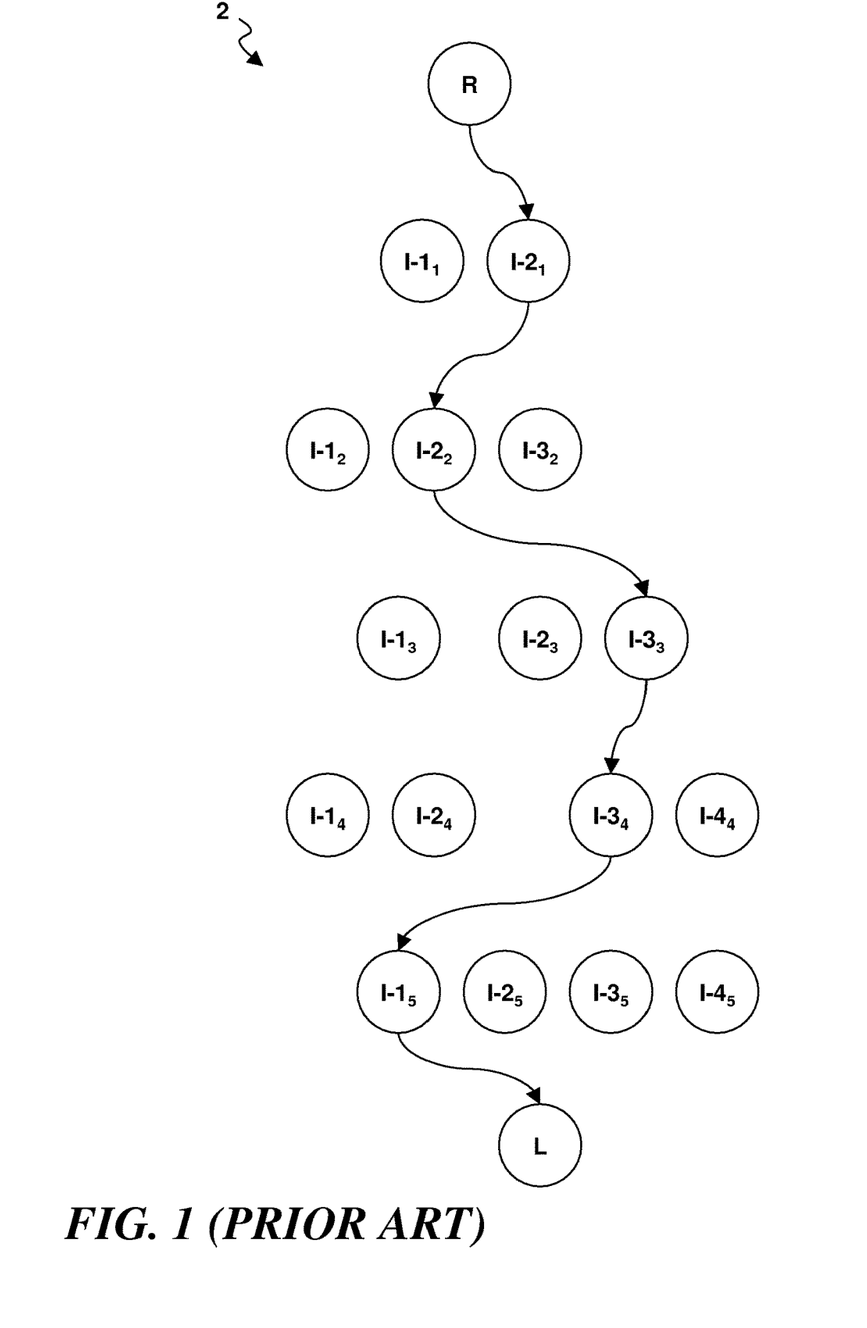
FIG. 1 is a functional block diagram showing an example hierarchical data structure.

Turning now to the figures, wherein like reference numerals represent like elements in all of the several views, FIG. 1 illustrates an example hierarchical data structure 2 containing a set of linked nodes arranged as an acyclic connected graph, namely, an ordered tree. The nodes of the data structure 2 include a top level root node R, five levels of internal nodes $I-1_1-I-4_5$, and a leaf node L. The nodes of the data structure 2 could represent any type of object that may be organized into a hierarchy with other objects. Examples include file system objects, heap storage objects, binary search tree objects, sorting (e.g., B-tree) objects, and data compression tree objects, to name but a few.

Conventional searching of hierarchical data structures entails "walking" the nodes of the structure until the desired node (internal or leaf) is found. FIG. 1 illustrates this type of a search. If the search target is a leaf node, such a search requires that the entire depth of the data structure be traversed, starting from the root node. Every single node of a given path has to be read, identified and compared to determine the next step to be followed. For hierarchical data structures of large size and complexity, this type of sequential searching can consume significant processing resources. The path names themselves can be lengthy and require more processing than short path names (e.g., due to CPU-intensive string comparisons). Computer file systems are an example. In a conventional file system, files and directories are represented in memory using objects (data structures) such as inodes and dentry (directory-entry) nodes. As is well known, inodes contain the information needed by an operating system to locate a file on a storage device, such as a disk drive. Dentry nodes allow the operating system to locate inodes based on directory path and file name information. The dentry nodes for recently accessed files and directories are typically organized as an ordered tree whose root and intermediate nodes represent directories, and whose leaf nodes represent files. Thus, if FIG. 1 is implemented as a dcache, the root node R would be a dentry node that represents the topmost root directory, the internal nodes I would be dentry nodes that represent subdirectories, and the leaf node L would be a dentry node for a file. Each dentry node contains a pointer to its corresponding inode. Once the dentry node for a particular file is found, its inode can be accessed.

Searching a dentry tree from the root dentry node to a desired file dentry node could become quite resource intensive if the tree is complex due to the presence of many directory levels that create deep hierarchies and lengthy path names. Thus, operating systems such as Linux® can employ a hash table known as the dentry cache. A dentry cache lookup operation can quickly find a child of any parent directory by hashing the parent directory's dentry node pointer and the child's name. Without the dentry cache, a searcher would need to traverse a linked list that extends from the parent directory's dentry node through all of the dentry nodes that are the immediate children of the parent directory. A disadvantage of the Linux® dentry cache is that a hash table lookup is required at each level of the dentry tree hierarchy. Thus, there is still a need to walk the dentry tree. The dentry cache only speeds up the time required to descend from one level in the hierarchy to the next. Again, for large file systems with deep hierarchies and lengthy path names, searching for a given file remains a resource intensive activity.

Example Embodiments

To alleviate the complexity of searching hierarchical data structures, applicants have developed a technique that may be used to automatically convert possibly very long pathnames into information for resolving endpoints in the hierarchy that correspond to the given pathnames. Instead of traversing a hierarchical data structure, such as the ordered tree of FIG. 1, a path from the root node to any desired endpoint within the data structure, be it a leaf node or an internal node, is directly processed into a corresponding location (e.g., a pointer) or other information for resolving the target endpoint. This processing uses an encoding between the path through the hierarchical data structure and the target endpoint. For example, the encoding may relate the pathname to a concise path code. Based on the path code, the information required to resolve the target endpoint can be found and an output generated so that the searcher can immediately reference the endpoint.

Figure 2:
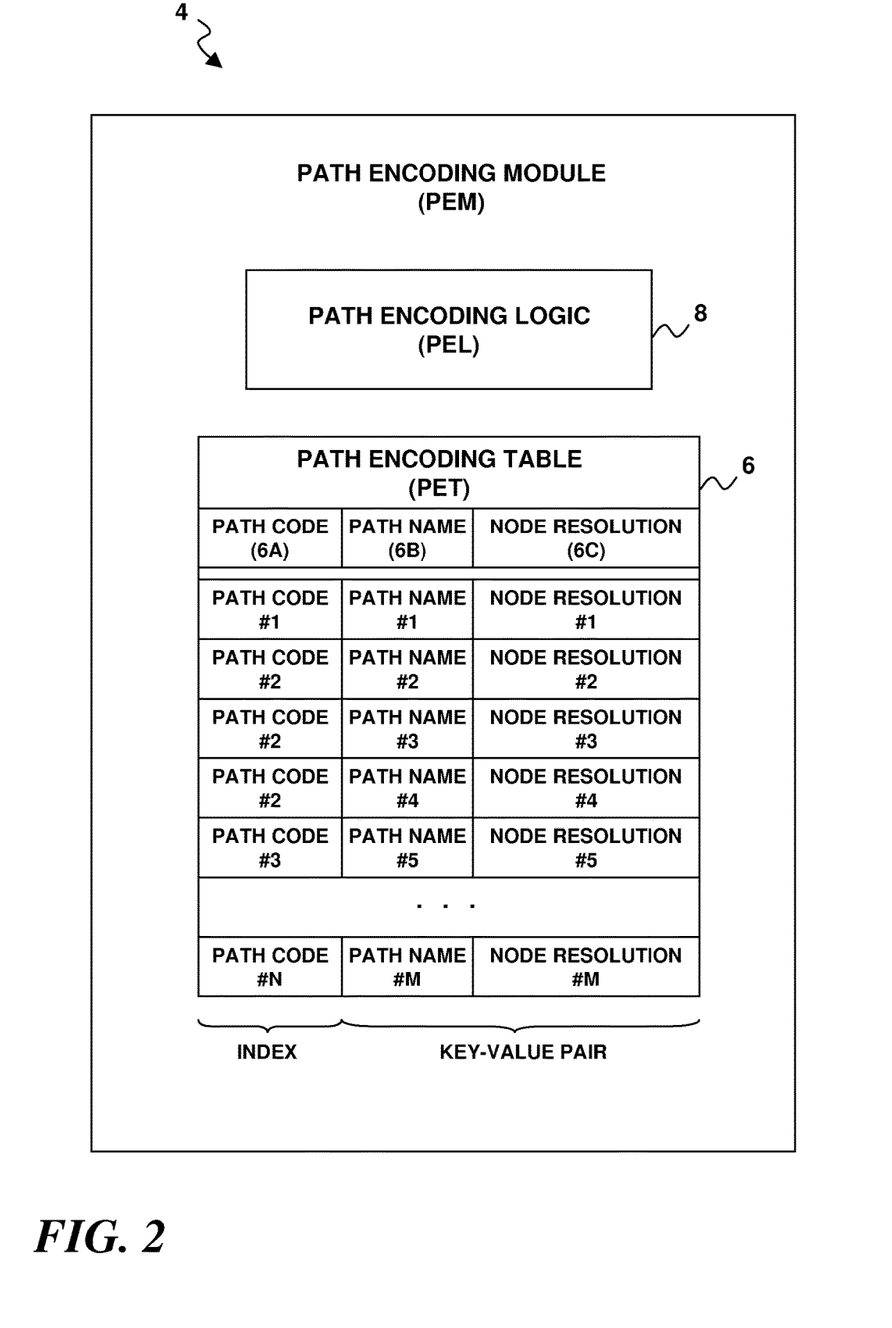
FIG. 2 is a functional block diagram showing an example pathcode/pointer data structure.

The pathname/location encoding and the logic needed to process a pathname into path endpoint resolution information may be implemented in any desired manner. FIG. 2 illustrates one example in which the disclosed technique is implemented by a Path Encoding Module (PEM) 4. The PEM 4 is used to assign a concise (terse) path code to an arbitrarily selected part of a path through a hierarchical data structure of any complexity. This path is specified by a pathname that identifies the levels of the hierarchy that are traversed by the path. Using computer file system nomenclature, the levels of hierarchy may be separated in the pathname by a special (escape) character such as '/' or '\'. A typical complex path may thus be represented as follows:

/ThisIsAVeryLongPathNameOnLevel1/ThisIsAVery-
LongPathNameOnLevel2/ThisIsAVeryLongPath-
NameOnLevel3 . . . .

Each part of the pathname contained within a given pair of the special characters represents a node of the hierarchy. As can be seen in FIG. 1, a node may contain any number of other nodes, which are children of a given node. Specifically, an object represented by a node may be an end point object, such as a file, or it may comprise a pointer or other link to a node that is lower in the hierarchy. Nodes that represent end point objects are leaf nodes and nodes that point to lower nodes in the hierarchy are internal nodes.

In order to navigate to an object with a specific path, a traditional search needs to start at the root node (or some known internal node) and follow the hierarchy, find the entry for a child node that is one level lower in the hierarchy, look up that node, and recursively repeat this process for each level. In contrast, the PEM 4 is used to find a path code that represents any part of a path. For example, a path code can represent an entire pathname from a root node to an end point object (such as a file, a location in an XML document, etc.). A path code can also represent a portion of a pathname beginning at the root node and descending one or more levels of the hierarchy to another internal node (such as a directory), or from a known internal node (such as the current directory of a process) to another internal node or to a leaf node. In other words, the path begins at the root node (or a known internal node) and can extend through one or more intermediate nodes and end at any node. Based on the path code, the PEM 4 is able to quickly identify a location or other information for resolving the object that stores the information about the node representing the endpoint of the specified path. This eliminates the necessity to traverse the hierarchy.

As can be seen in FIG. 2, the PEM 4 includes a look-up table 6 that may be referred to as a Path Encoding Table (PET). The PET 6 maintains path codes 6A corresponding to pathnames 6B in association with location pointers 6C. As described in more detail below, the path code for any input pathname may be determined using an encoding algorithm. The path code may then be used to resolve the pathname endpoint for access without traversing the path. The endpoint may be resolved using specified endpoint resolution information that allows the pathname endpoint to be located or identified and accessed for processing. For example, the endpoint resolution information could be specified as a location pointer to a memory address, to a disk block, or to any other physical (or logical) location that holds an object representing or corresponding to the pathname endpoint. The endpoint resolution information could also be specified using non-location information (e.g., an object name or number) that allows the endpoint to be located and accessed. In a file system environment, a pointer to a dentry node, an inode or other types of file system data structures, or the name or number assigned to an inode, a disk logical block, or other identifiable file system object, are all examples of possible endpoint resolution information. In an XML hierarchy, a unique node ID or a node's memory location are further examples of endpoint resolution information. A path code may be associated with endpoint resolution information in any desired fashion, such as by storing the path code in association with the endpoint resolution information, indexing the endpoint resolution information using the path code, or maintaining any other desired path code-endpoint relationship. The PEM 4 also includes logic 8 for creating and maintaining the PET 6, and for using the PET 6 to translate pathname inputs into endpoint resolution outputs. The logic 8 may be referred to as Pathname Encoding Logic (PEL).

A component using the PEM 4 (e.g. an operating system component or a user application) provides a pathname as an input and receives endpoint resolution information as an output. The PEL 8 is adapted to derive a path code 6A that corresponds to the input pathname. There are various encoding algorithms that the PEL 8 may use to perform this operation, including a hash function. In that case, the PET 6 could be represented as a hash table. As persons skilled the art will appreciate, a hash function associates hash input values (hash keys) with hash array indexes that identify hash buckets containing one or more key-value pairs. If the PEL 8 implements a hash function, each input pathname (the hash key) would hash to a path-code 6A (the hash index). Each hash index would be associated with one or more key-value pairs, namely an input pathname 6B in association with endpoint resolution information 6C (the hash bucket).

FIG. 2 illustrates example entries in the PET 6. The path codes 6A representing hash indices are in the left-hand column. The pathnames 6B and the endpoint resolution information 6C respectively occupy the middle and right-hand columns, and represent key-value pairs associated with the hash indices. It will be seen that the PEL 8 in this case implements a non-unique hash function because pathnames #2, #3 and #4 all hash to path-code #2. If the PET 6 is arranged as a closed hashing table and the PEL 8 hash function uses open addressing, the hash function will arrive at the first array index position corresponding to path-code #2. It will then probe the PET 6 (as by inspecting successive index positions) until the desired pathname 6B is found (i.e., the one used as the hash key). At this point, the correct endpoint resolution information 6B may be selected.

Figure 3:
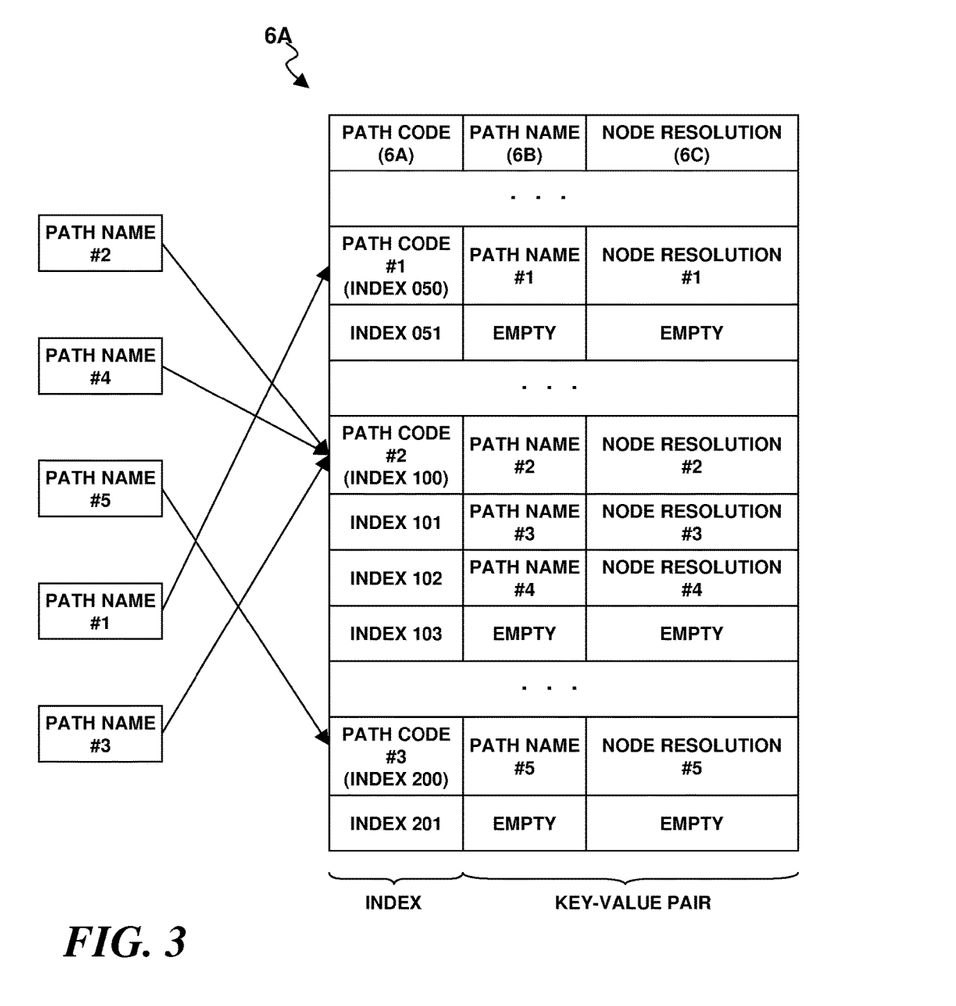
FIG. 3 is a functional block diagram showing a detailed view of the data structure of FIG. 2 according to an example embodiment thereof.

FIG. 3 represents another view of the PET 6 as a closed hashing table array 6A. As can be seen, path code #1 represents an array index having an actual value of 050 and thus corresponds to array index position [050]. Hashing pathname #1 produces the 050 array index as the path code. Leaving index position 051 empty can be used to signify that the end of the path code #1 hash bucket has been reached. Path code #2 represents an array index that has an actual value of "100" and thus corresponds to array index position [100]. Hashing any of pathnames #2, #3 and #4 produces the 100 array index value as the path code. The PEL 8 goes to index position 100 and begins checking the pathnames, advancing through array index positions 100, 101 and 102 as necessary. Leaving index position 103 empty can be used to signify that the end of the path code #2 hash bucket has been reached. Path code #3 represents an array index having an actual value of 200 and thus corresponds to array index position [200]. Hashing pathname #5 produces the 200 array index as the path code. Leaving index position 201 empty can be used to signify hat the end of the path code 31 hash bucket has been reached. It will be appreciated that probing a multi-element hash bucket (e.g., as represented by path code #2) need not be based on successive array positions. As is known in the art, the probe interval could be based on any number "n" of array positions, with "n" being either fixed or variable (e.g., in proportion to the hash value). The probe interval could also be computed using a second hash function.

Figure 4:
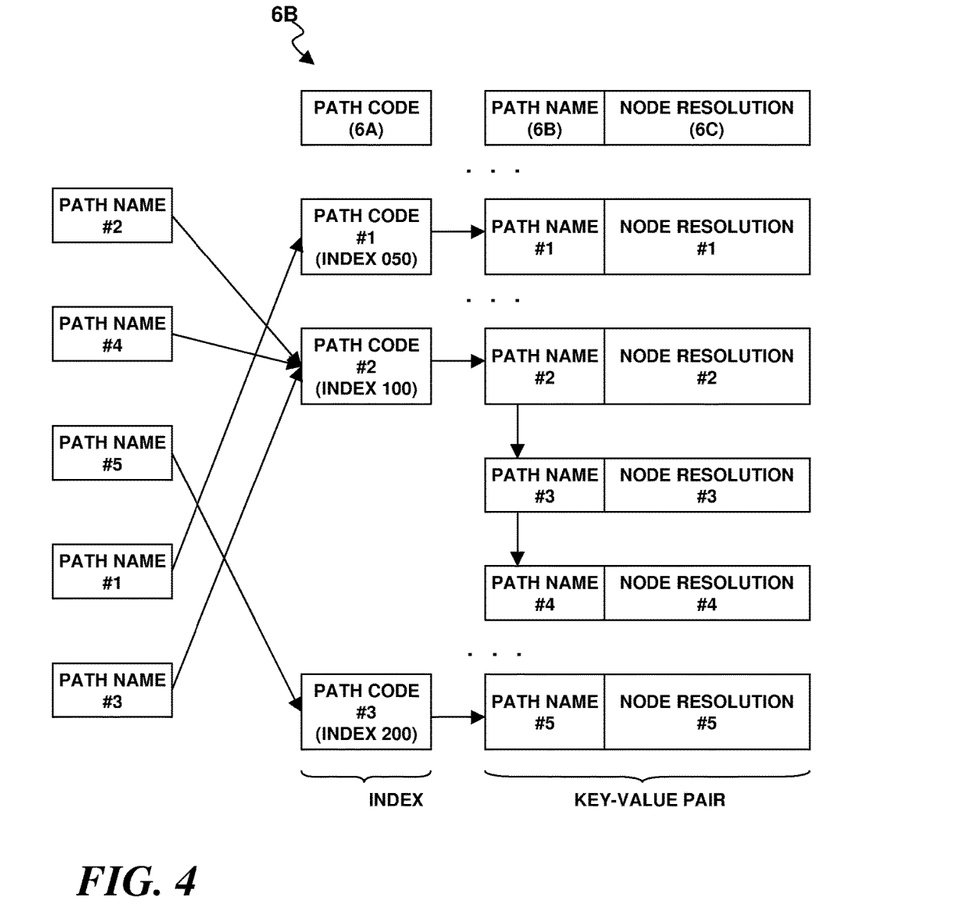
FIG. 4 is a functional block diagram showing a detailed view of the data structure of FIG. 2 according to another example embodiment thereof.

FIG. 4 represents a view of the PET 6 when implemented as a hash table array 6B with hash bucket chaining. Each hash bucket corresponding to a path code is arranged as a linked list. When the PEL 8 hashes an input pathname to a particular path code, the linked list of pathname hash bucket elements is traversed until the pathname representing the hash key is found.

It will be appreciated that other forms of probing could be used to locate pathnames that hash to the same path code. For hash tables with small bucket sizes, the vectoring approach illustrated by FIGS. 3 and 4 may be quite satisfactory. On the other hand, if hash buckets are large, a probing technique based on sorting may be used. For example, the pathnames within a single bucket could be arranged in a search tree (e.g., a B-tree) that allows the desired pathname to be quickly located without searching through the entire hash bucket. The hash bucket could also be set up as a sorted vector so that pathnames are arranged (and probed) according to a desired order. If such a sorting technique is used in a file system implementation, pathnames representing most frequently used (or most recently used) directories and files could be probed ahead of less frequently used (or less recently used) pathnames. Other sorting methods could also be used, depending on factors such as prevailing operational conditions, processing capabilities, memory availability, etc.

It will also be appreciated that the PET 6 represents an example of a non-unique hashing algorithm in which multiple pathnames will hash to the same path code, thereby resulting in collisions that must be resolved through probing, as discussed above. This type of hash algorithm is quite common and can be based on existing hashing algorithms that are very efficient and relatively easy to implement. As an alternative to this type of pathname/endpoint encoding technique, a unique hashing algorithm could also be used. In that case, each input pathname could hash to a unique path code. Although this technique would eliminate hash collisions and probing, such algorithms are usually complex and may result in a performance penalty that offsets their value. Still another pathname/endpoint encoding technique would be to maintain a lookup table (e.g., a database relational table) whose entries comprise pathname/endpoint correlations. Other pathname/endpoint encoding techniques could no doubt also be used.

Figure 5:
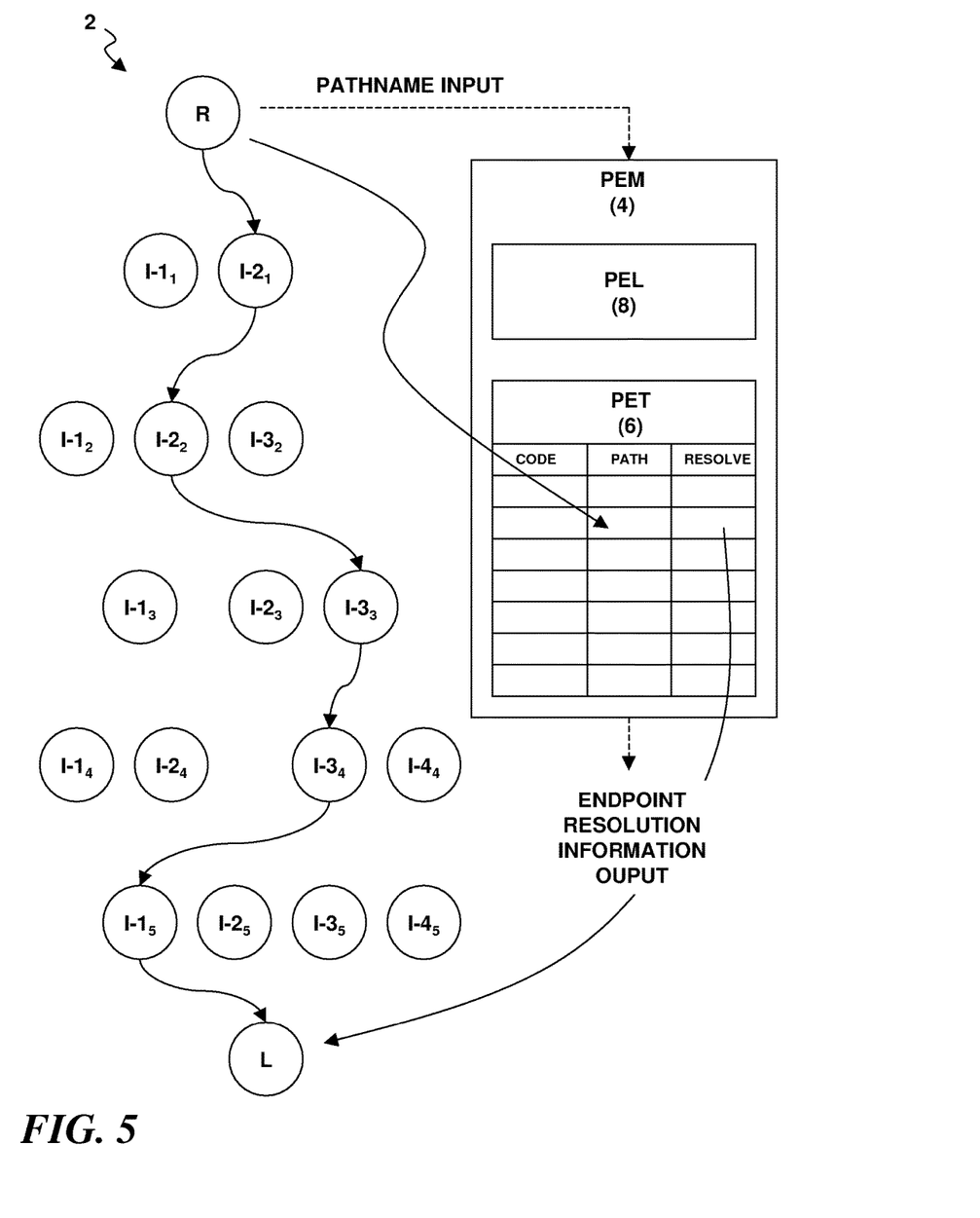
FIG. 5 is a functional block diagram showing example pathname processing.

Turning now to FIG. 5, it will be seen how the PEM 4 receives a pathname input from a caller and delivers an endpoint resolution information output. The path is the same one shown in FIG. 1 that extends from the root node R to the leaf node L. Thus, the pathname input could be of the form: $R/I-2_1/I-2_2/I-3_3/I-3_4/I-1_5/L$.

Figure 6:
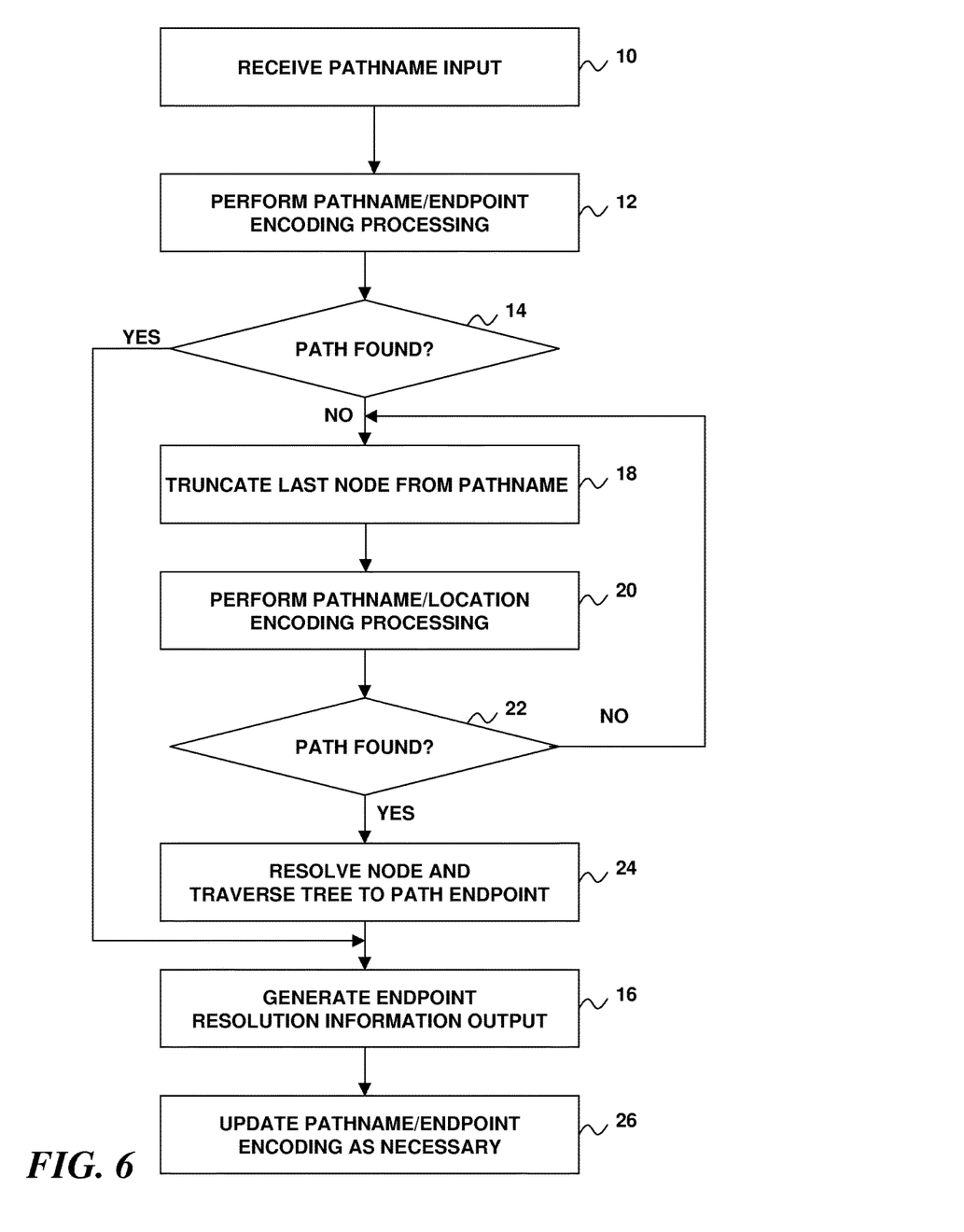
FIG. 6 is a flow diagram showing an embodiment of the pathname processing of FIG. 5.

FIG. 6 illustrates an example of processing that may be implemented by the PEM 4 to provide this service. In block 10 of FIG. 6, the pathname input is received by the PEM 4. In block 12, the PEL 8 performs pathname/endpoint encoding processing. For example, using the PET 6 of FIG. 2, the PEL 8 can hash the input pathname to determine a path code 6A. The PEL 8 may then probe the hash bucket associated with the identified path code 6A, inspecting pathnames 6B within the hash bucket for one that matches the input pathname. In block 14, the PEL 8 determines if a match for the entire path and associated endpoint resolution information already exists. If true, the endpoint resolution information is immediately returned to the caller in block 16. If the input pathname is not found in block 14, processing by the PEL 8 may enter the recursive processing of blocks 18, 20 and 22 in which the input pathname is parsed in backwards fashion until an encoded subpath is found. Block 18 truncates the last node of the input pathname, block 20 performs pathname/endpoint encoding processing (as per block 12), and block 22 tests for a match of the truncated pathname and associated endpoint resolution information. This processing continues until a subpath having matching endpoint resolution information is found. In that case, the PEL 8 may implement block 24 by using the endpoint resolution information to quickly "jump" to the node represented by this subpath (or an object associated therewith). Then the hierarchy may be followed over the remainder of the path in conventional node-to-node fashion to reach the original path endpoint. The PEL 8 may then output the endpoint location to the caller in block 16. In block 26, the PEL 8 can automatically add the original pathname input to the pathname/endpoint encoding for future reference. In addition, while traversing the remainder of the path, the PEL 8 could automatically add a pathname/endpoint encoding for each encountered subpath, therefore enabling future fast path lookups for all visited nodes.

The foregoing processing offers several advantages over conventional techniques used for complex endpoint resolution in hierarchical data structures. For example, the technique facilitates extremely fast traversing and accessing of any object in large and complex data structures, such as file systems, XML documents, etc., by bypassing non-endpoint nodes. Even if a full path is not maintained by PEM 4, a subpath may be present and this will represent a shortcut through the hierarchy, allowing all intervening nodes to be bypassed. The technique also eliminates or significantly reduces contention on nodes, such as file system directories, because large portions of the hierarchy are bypassed. The technique additionally increases access throughput by facilitating fast path navigation and traversal through large numbers of nodes, such as directories and objects of large file systems.

The disclosed technique is also flexible so that it can be customized to favor certain types of nodes. As discussed above, in a file system environment the PEM 4 may be adapted to favor most frequently used (or most recently used) files and directories. The technique can also support complex hierarchies that span multiple systems (distributed hierarchies), such as distributed file systems. For example, the PET 6 may contain path codes and endpoint resolution information for distributed environments (e.g., shared-memory clusters), such as NUMA (Non-Uniform Memory Access) machines. In that case, the PEM 4 could be a single cluster-wide PEM or a per-system PEM.

Figure 7:
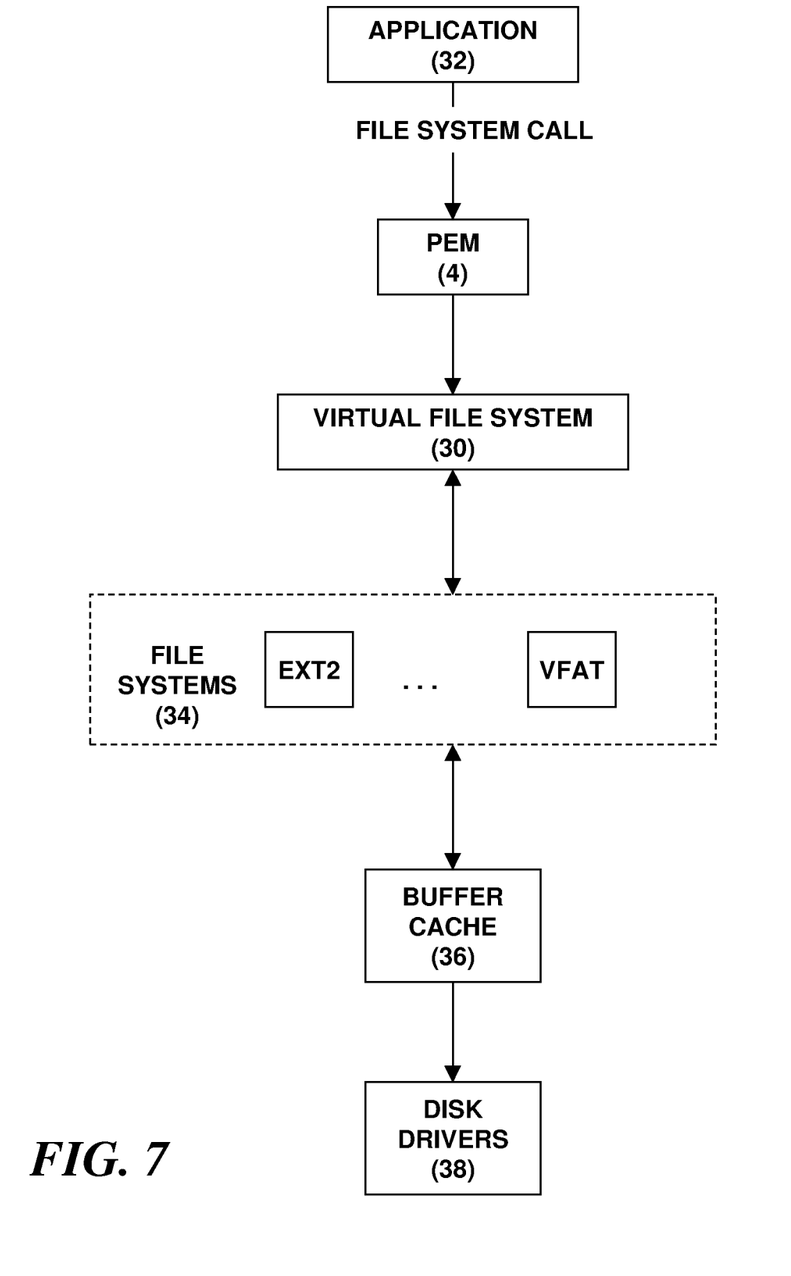
FIG. 7 is an example embodiment of how the pathname processing of FIG. 4 could be used in a computer file system.

A further advantage of the present technique is that it does not require modification of the existing hierarchy data structures. These can remain intact. For example, if the present technique is used with a computer file system tree hierarchy, the existing tree is not modified. Instead, the PET 6 can be built independently of the tree. No additional elements, such as symbolic links, need to be added to the hierarchy. An existing file system (e.g., the Linux® VFS file system) could work with the present technique with little or no change. For example, as shown in FIG. 7, the PEM 4 could be added as an operating system kernel component that operates in conjunction with (or as part of) a virtual file system (VFS) 30. The virtual file system 30 is used to provide an interface between an application 32 and actual file systems 34 (such as ext2, vfat, etc.) that transfer data to and from physical storage devices via lower level software components, such as a buffer cache 36 and device drivers 38. The application 32 will periodically issue VFS system calls, such as open( ), mkdir( ), rename( ), and stat( ), that pass a file pathname and require that the virtual file system 30 perform a pathname lookup operation to locate the file's inode. The principle of interposition could be used by the PEM 4 to intercept pathname lookup requests (e.g. to the virtual file system), resolve them into a pathname endpoint identifier (e.g., an inode number, a dentry node pointer, etc.), and then pass control to an existing file system routine that requires the endpoint resolution information in order to resolve the requested file's location.

A still further advantage of the disclosed technique is that the pathname/endpoint encoding (e.g., the PET 6) can be persisted on a storage device so that it survives IPL (Initial Program Load) or reboots and crashes. In many cases, the physical location, name, number or other identifier of a given node will not change unless the hierarchy is reorganized. For example, file system inode numbers are static and persist across reboots, as is information stored in non-volatile memory. Cases where the endpoint resolution information may not remain static are pointers to objects stored in volatile memory (e.g., dentry nodes). In such cases, the PEM 4 would contain an invalid pointer if the physical location of a node changes. Such conflicts may be resolved in various ways. One approach would be to handle an invalid pointer exception in the same way as the condition where no entry exists in the PET 6. Once the valid pointer is found, it can be used to update the PET entry for a given path. Another approach that may be used for file systems that support call-backs is to have the PEM 4 register a call back routine that would be invoked each time a location of a node in a file system changes. The routine would update the pointer in the PET 6 for a given path. It will also be appreciated that standard file mapping and shared memory utilities offer a wide range of possibilities to achieve data persistence for many applications in which the PEM 4 can be used.

Figure 8:
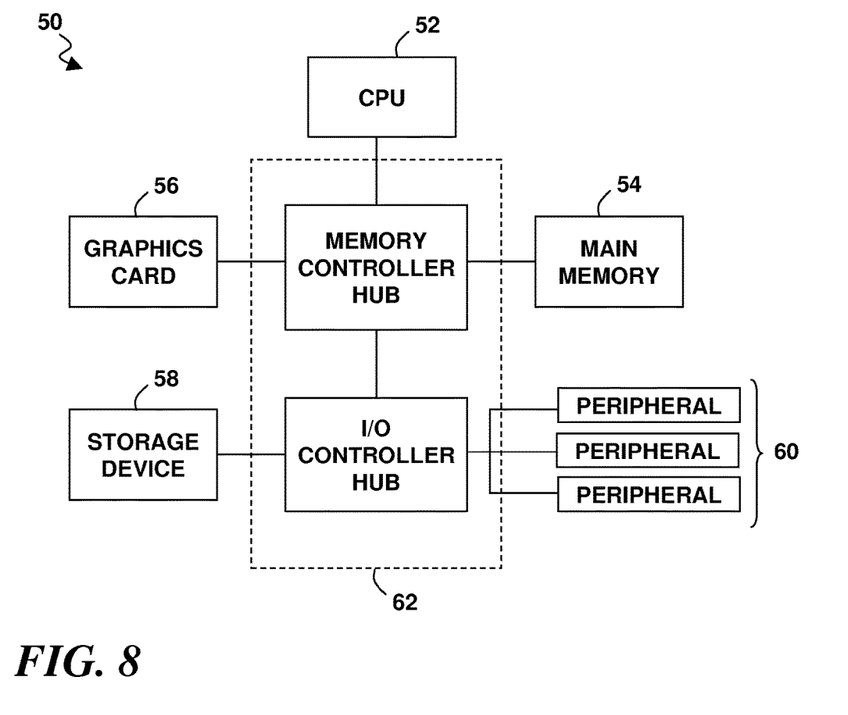
FIG. 8 is a functional block diagram showing an example hardware system that could be used to implement the processing of FIG. 4.

Accordingly, a technique for optimizing complex endpoint resolution in a hierarchical data structure has been disclosed. It will be appreciated that the foregoing concepts may be variously embodied in any of a data processing system, a machine implemented method, and a computer program product in which programming logic is provided by one or more machine-useable media for use in controlling a data processing system to perform the required functions. Relative to a data processing system and machine implemented method, FIG. 8 illustrates one example hardware environment 50 that may be used to implement the PEM 4 of FIG. 2. The hardware environment 50 includes one or more CPUs or other logic implementing hardware 52 and a main memory 54 that collectively provide a processing core, an optional video card 56 for generating visual output information to an optional display monitor (not shown), a peripheral storage device 58, other peripheral devices 60, and a bus or other communication infrastructure (e.g., a switch) 62 interconnecting the foregoing elements. If implemented in software, PEM 4 may be loaded in the main memory 54 from persistent storage on the storage device 58. If implemented in firmware, the PEM 4 could reside in a portion of the main memory 54 that comprises ROM (Read-Only Memory). The PEM 4 could also be implemented using dedicated hardware logic. Various I/O (Input/Output) resources may be provided by the peripheral devices 60, which may include a USB bus controller, a SCSI disk controller, and a NIC.

Figure 9:
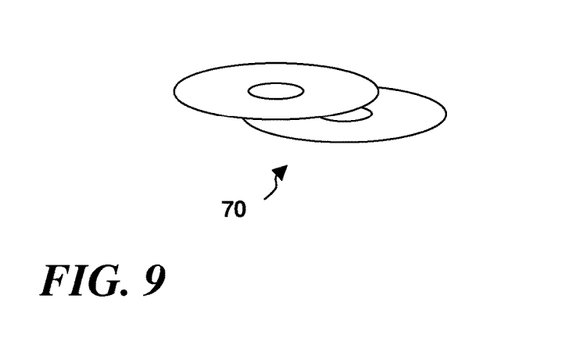
FIG. 9 is a diagrammatic illustration showing media that may be used to provide a computer program product for implementing the processing of FIG. 4.

Relative to a computer program product having a machine-readable media and programming logic, exemplary data storage media for storing the programming logic are shown by reference numeral 70 in FIG. 9. The media 70 are shown as being portable optical storage disks of the type that are conventionally used for commercial software sales, such as compact disk-read only memory (CD-ROM) disks, compact disk-read/write (CD-R/W) disks, and digital versatile disks (DVDs). Such media can store the PEM 4 of FIG. 2, either alone or in conjunction with another software product that incorporates the required functionality (such as an operating system distribution). The foregoing logic and data could also be provided by portable magnetic media (such as floppy disks, flash memory sticks, etc.), or magnetic media combined with drive systems (e.g. disk drives), or media incorporated in data processing platforms, such as random access memory (RAM), read-only memory (ROM) or other semiconductor or solid state memory. More broadly, the media could comprise any electronic, magnetic, optical, electromagnetic, infrared, semiconductor system or apparatus or device, transmission or propagation signal or medium (such as a network), or other entity that can contain, store, communicate, propagate or transport the programming logic for use by or in connection with a data processing system, computer or other instruction execution system, apparatus or device. It will also be appreciated that the invention may be embodied in a combination of hardware logic and software elements, and that the software elements may include but are not limited to firmware, resident software, microcode, etc.

While various embodiments of the invention have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A machine-implemented method for optimizing complex path endpoint resolution in a hierarchical data structure, comprising:
creating an encoding between paths through said hierarchical data structure and endpoint nodes of said paths;
said hierarchical data structure being stored in a memory as a searchable tree hierarchy that is navigatable by traversing sets of linked nodes situated on said paths from a root node to said endpoint nodes;
said creating said encoding comprising separately storing said encoding in said memory as an entity that is distinct from said hierarchical data structure;
said creating said encoding comprising creating a path encoding table having a set of table entries, each table entry including a pathname defining a path through said hierarchical data structure to an endpoint node of said path, and an endpoint identifier that identifies a location where said endpoint node is stored in said memory;
said creating said encoding comprising creating said path encoding table to further include a set of path codes that are each associated with one or more of said table entries, each said path code being a representation of one or more of said pathnames, said representation being generated from said one or more pathnames using an encoding function;
receiving a target input pathname corresponding to a target path to a target endpoint node in said hierarchical data structure;
performing resolving operations to resolve said target endpoint node using said path encoding table in order to access said target endpoint node in said memory without traversing said target path, said resolving operations comprising:
applying said encoding function to said target input pathname to generate a target path code;
performing a look-up in said path encoding table to find said target path code;
upon finding said target path code in said path encoding table, finding a unique target table entry associated with said target path code that contains said target input pathname; referencing a target endpoint identifier in said target table entry; and
using said target endpoint identifier for finding said location where said endpoint node is stored in said memory and upon said finding directly accessing said location.

2. The method of claim 1, further including wherein if said target path to said target endpoint node does not have a corresponding table entry in said path encoding table, (1) performing recursive processing to parse said target pathname in backwards fashion until a table entry for an encoded subpath to an intermediate non-endpoint node of said target path is found in said path encoding table, (2) resolving said intermediate non-endpoint node using said path encoding table and said resolving operations of claim 1 to access a location of said intermediate non-endpoint node in said memory, (3) starting from said non-endpoint node in said memory, traversing a remainder of said target path by traversing a corresponding set of said linked nodes of said hierarchical data structure in said memory to said target endpoint node in said memory, (4) applying said encoding function to said input pathname to generate a corresponding path code, (5) adding said corresponding path code to said path encoding table if it is not already in said path encoding table, and (6) adding a new table entry for said target endpoint node in said path encoding table in association with said corresponding path code in said path encoding table.

3. The method of claim 1, wherein said encoding function comprises a hash function and said path encoding table comprises a hash table, and further wherein said target path code represents an encoding of more than one pathname and said hash table stores key-value pairs that each comprise one of said pathnames and a corresponding one of said endpoint identifiers, and wherein said resolving operations comprise searching said key-value pairs for a pathname matching said target input pathname.

4. The method of claim 3, wherein said key-value pairs are sorted to prioritize said pathnames.

5. The method of claim 1, wherein said hierarchical data structure comprises a file system tree and said target endpoint node is resolved by resolving said target input pathname into a location, number or name identifier associated with a file system object.

6. The method of claim 1, wherein said path encoding table is maintained in persistent storage.

7. A system for optimizing complex path endpoint resolution in a hierarchical data structure, comprising:
one or more processors;
a memory coupled to said one or more processors, said memory including a computer useable medium tangibly embodying at least one program of instructions executable by said processor to perform operations, comprising:
creating an encoding between paths through said hierarchical data structure and endpoint nodes of said paths;
said hierarchical data structure being stored in a memory as a searchable tree hierarchy that is navigatable by traversing sets of linked nodes situated on said paths from a root node to said endpoint nodes;
said creating said encoding comprising separately storing said encoding in said memory as an entity that is distinct from said hierarchical data structure;
said creating said encoding comprising creating a path encoding table having a set of table entries, each table entry including a pathname defining a path through said hierarchical data structure to an endpoint node of said path, and an endpoint identifier that identifies a location where said endpoint node is stored in said memory;
said creating said encoding comprising creating said path encoding table to further include a set of path codes that are each associated with one or more of said table entries, each said path code being a representation of one or more of said pathnames, said representation being generated from said one or more pathnames using an encoding function;
receiving a target input pathname corresponding to a target path to a target endpoint node in said hierarchical data structure;
performing resolving operations to resolve said target endpoint node using said path encoding table in order to access said target endpoint node in said memory without traversing said target path, said resolving operations comprising:
applying said encoding function to said target input pathname to generate a target path code;
performing a look-up in said path encoding table to find said target path code;
upon finding said target path code in said path encoding table, finding a unique target table entry associated with said target path code that contains said target input pathname; referencing a target endpoint identifier in said target table entry; and using said target endpoint identifier for finding said location where said endpoint node is stored in said memory and upon said finding directly accessing said location.

8. The system of claim 7, further including wherein if said target path to said target endpoint node is not encoded in said path encoding table, (1) performing recursive processing to parse said target pathname in backwards fashion until an encoded subpath to an intermediate non-endpoint node of said target path is found in said path encoding table, (2) resolving a intermediate non-endpoint node using said path encoding table and said resolving operations of claim 7 to access a location of said intermediate non-endpoint node in said memory, (3) starting from said non-endpoint node in said memory, traversing a remainder of said target path by traversing a corresponding set of said linked nodes of said hierarchical data structure in said memory to said target endpoint node in said memory, (4) applying said encoding function to said input pathname to generate a corresponding path code, (5) adding said corresponding path code to said path encoding table if it is not already in said path encoding table, and (6) adding a new table entry for said target endpoint node in said path encoding table in association with said corresponding path code in said path encoding table.

9. The system of claim 7, wherein said encoding function comprises a hash function and said path encoding table comprises a hash table, and further wherein said target path code represents an encoding of more than one pathname and said hash table stores key-value pairs that each comprise one of said pathnames and a corresponding one of said endpoint identifiers, and wherein said resolving operations comprise searching said key-value pairs for a pathname matching said input pathname.

10. The system of claim 9, wherein said key-value pairs are sorted to prioritize said pathnames.

11. The system of claim 7, wherein said hierarchical data structure comprises a file system tree and said target endpoint node is resolved by resolving said target input pathname into a location, number or name identifier associated with a file system object.

12. The system of claim 7, wherein said path encoding table is maintained in persistent storage.

13. A computer program product, comprising:
one or more non-transitory machine-useable storage media;
logic provided by said one or more machine-useable storage media for programming a data processing platform to perform operations for optimizing complex path endpoint resolution in a hierarchical data structure, as by:
creating an encoding between paths through said hierarchical data structure and endpoint nodes of said paths;
said hierarchical data structure being stored in a memory as a searchable tree hierarchy that is navigatable by traversing sets of linked nodes situated on said paths from a root node to said endpoint nodes;
said creating said encoding comprising separately storing said encoding in said memory as an entity that is distinct from said hierarchical data structure;
said creating said encoding comprising creating a path encoding table having a set of table entries, each table entry including a pathname defining a path through said hierarchical data structure to an endpoint node of said path, and an endpoint identifier that identifies a location where said endpoint node is stored in said memory;
said creating said encoding comprising creating said path encoding table to further include a set of path codes that are each associated with one or more of said table entries, each said path code being a representation of one or more of said pathnames, said representation being generated from said one or more pathnames using an encoding function;
receiving a target input pathname corresponding to a target path to a target endpoint node in said hierarchical data structure;
performing resolving operations to resolve said target endpoint node using said path encoding table in order to access said target endpoint node in said memory without traversing said target path, said resolving operations comprising:
applying said encoding function to said target input pathname to generate a target path code;
performing a look-up in said path encoding table to find said target path code;
upon finding said target path code in said path encoding table, finding a unique target table entry associated with said target path code that contains said target input pathname; referencing a target endpoint identifier in said target table entry; and
using said target endpoint identifier for finding said location where said endpoint node is stored in said memory and upon said finding directly accessing said location.

14. The computer program product of claim 13, further including wherein if said target path to said target endpoint node is not encoded in said path encoding table, (1) performing recursive processing to parse said target pathname in backwards fashion until an encoded subpath to an intermediate non-endpoint node of said target path is found in said path encoding table, (2) resolving said intermediate non-endpoint node using said path encoding table and said resolving operations of claim 13 to access a location of said intermediate non-endpoint node in said memory, (3) starting from said non-endpoint node in said memory, traversing a remainder of said target path by traversing a corresponding set of said linked nodes of said hierarchical data structure in said memory to said target endpoint node, (4) applying said encoding function to said input pathname to generate a corresponding path code, (5) adding said corresponding path code to said path encoding table if it is not already in said path encoding table, and (6) adding a new table entry for said target endpoint node in said path encoding table in association with said corresponding path code in said path encoding table.

15. The computer program product of claim 13, wherein said encoding function comprises a hash function and said path encoding table comprises a hash table, and further wherein said target path code represents an encoding of more than one pathname and said hash table stores key-value pairs that each comprise one of said more than one pathnames and a corresponding one of said endpoint identifiers, and wherein said resolving operations comprise searching said key-value pairs for a pathname matching said target input pathname.

16. The computer program product of claim 15, wherein said key-value pairs are sorted to prioritize said pathnames.

17. The computer program product of claim 13, wherein said hierarchical data structure comprises a file system tree and said target endpoint node is resolved by resolving said target input pathname into a location, number or name identifier associated with a file system object.

18. The computer program product of claim 13, wherein said path encoding table is maintained in persistent storage.

* * * * *